US012698563B2

(12) United States Patent
Kim et al.

(10) Patent No.: US 12,698,563 B2
(45) Date of Patent: Aug. 4, 2026

(54) BUSBAR CONTACT COATINGS BY COLD SPRAY DEPOSITION

(71) Applicant: ROGERS CORPORATION, Chandler, AZ (US)

(72) Inventors: Eui Kyoon Kim, Acton, MA (US); Lori Brock, Ipswich, MA (US); Wei Shi, Suzhou (CN); Sebastiaan De Boodt, Ghent (BE); Patricia Schwartz, Proctorsville, VT (US); Yuqiang Zhang, Suzhou (CN); Samuel Boese, Allston, MA (US)

(73) Assignee: ROGERS CORPORATION, Chandler, AZ (US)

( * ) Notice: Subject to any disclaimer, the term of this patent is extended or adjusted under 35 U.S.C. 154(b) by 497 days.

(21) Appl. No.: 18/210,219

(22) Filed: Jun. 15, 2023

(65) Prior Publication Data

US 2023/0407483 A1 Dec. 21, 2023

Related U.S. Application Data

(60) Provisional application No. 63/352,298, filed on Jun. 15, 2022.

(51) Int. Cl.
*C23C 24/04* (2006.01)
*C09D 1/00* (2006.01)

(52) U.S. Cl.
CPC ................ *C23C 24/04* (2013.01); *C09D 1/00* (2013.01)

(58) Field of Classification Search
CPC ..... C23C 24/04; C23C 24/082; C23C 24/087; C23C 28/02; C23C 28/023; C23C 30/00;
(Continued)

(56) References Cited

U.S. PATENT DOCUMENTS

2010/0143700 A1* 6/2010 Champagne .......... B05B 7/1404
428/323
2018/0274104 A1* 9/2018 Reznik .................... C23C 24/04

FOREIGN PATENT DOCUMENTS

CN 111197164 A 5/2020
GB 2493219 A 1/2013
(Continued)

OTHER PUBLICATIONS

International Search Report of the ISA/EPO mailed Aug. 18, 2023 for International Application No. PCT/US2023/025376 filed Jun. 15, 2023, 4 pages.

(Continued)

*Primary Examiner* — William P Fletcher, III
(74) *Attorney, Agent, or Firm* — CANTOR COLBURN LLP

(57) ABSTRACT

In an aspect, a method of forming a coating on a busbar comprises cold spraying a powder comprising a plurality of metal particles onto the busbar at a velocity sufficiently high to cause the plurality of metal particles to deform upon contact with the busbar thereby forming the coating on the busbar; wherein the plurality of metal particles comprises greater than or equal to 50 weight percent of at least one of nickel, tin, silver, zinc, or copper based on the total weight of the metal particles; and wherein the coating has an average thickness of greater than or equal to 10 micrometers. In another aspect, a coated busbar is formed by cold spraying.

17 Claims, 6 Drawing Sheets

(58) Field of Classification Search
CPC .. C23C 24/08; C09D 1/00; H01R 4/58; H01R
13/03; H01R 25/145; H01R 43/16; H01B
1/02
See application file for complete search history.

(56) References Cited

FOREIGN PATENT DOCUMENTS

| | | | | |
|---|---|---|---|---|
| RU | 2572953 C1 * | 1/2016 | | |
| RU | 2588921 C2 * | 7/2016 | .............. | H05K 3/14 |
| WO | WO-2019142828 A1 * | 7/2019 | ............. | H01R 13/03 |

OTHER PUBLICATIONS

Written Opinion of the ISA/EPO mailed Aug. 18, 2023 for International Application No. PCT/US2023/025376 filed Jun. 15, 2023, 7 pages.

Billard, Alain, et al. "Emerging processes for metallurgical coatings and thin films," Comptes Rendus Physique, vol. 19 (2018) 755-768.

Nardi, Aaron. "Cold Spray Coatings for Chromium and Nickel Plating Replacement," SERDP project No. WP-2607, Final Report V3, U.S. Army Research Laboratory, Strategic Environmental Research and Development Program, Alexandria, VA, Nov. 5, 2019, 41 pages.

* cited by examiner

Example 15     Example 16     Example 17     Example 18

Example 19     Example 20     Example 21

BUSBAR CONTACT COATINGS BY COLD SPRAY DEPOSITION

CROSS REFERENCE TO RELATED APPLICATION

This application claims priority to and the benefit of U.S. Provisional Application No. 63/352,298 filed on Jun. 15, 2022, the entire content of which is incorporated herein by reference.

BACKGROUND

Busbar contact degradation from environmental corrosion is one of the major causes in reducing busbar performance. To prevent contact degradation, busbars can be coated, for example, by galvanic plating. However, plating often results in non-uniform coatings that can likewise decrease the life of the busbar. Additionally, achieving a plating coating with an increased thickness, for example, of about 20 micrometers is very expensive by plating.

Improved methods of coating busbars are desired.

BRIEF SUMMARY

Disclosed herein is a method of coating a busbar.

In an aspect, a method of forming a coating on a busbar comprises cold spraying a powder comprising a plurality of metal particles onto the busbar at a velocity sufficiently high to cause the plurality of metal particles to deform upon contact with the busbar thereby forming the coating on the busbar; wherein the plurality of metal particles comprises greater than or equal to 50 weight percent of at least one of nickel, tin, silver, zinc, or copper based on the total weight of the metal particles; and wherein the coating has an average thickness of greater than or equal to 10 micrometers.

In another aspect, a coated busbar is formed by cold spraying.

The above described and other features are exemplified by the following figures, detailed description, and claims.

BRIEF DESCRIPTION OF THE DRAWINGS

Refer now to the figures, which are exemplary aspects, and wherein the like elements are numbered alike.

DETAILED DESCRIPTION

Figure 1:
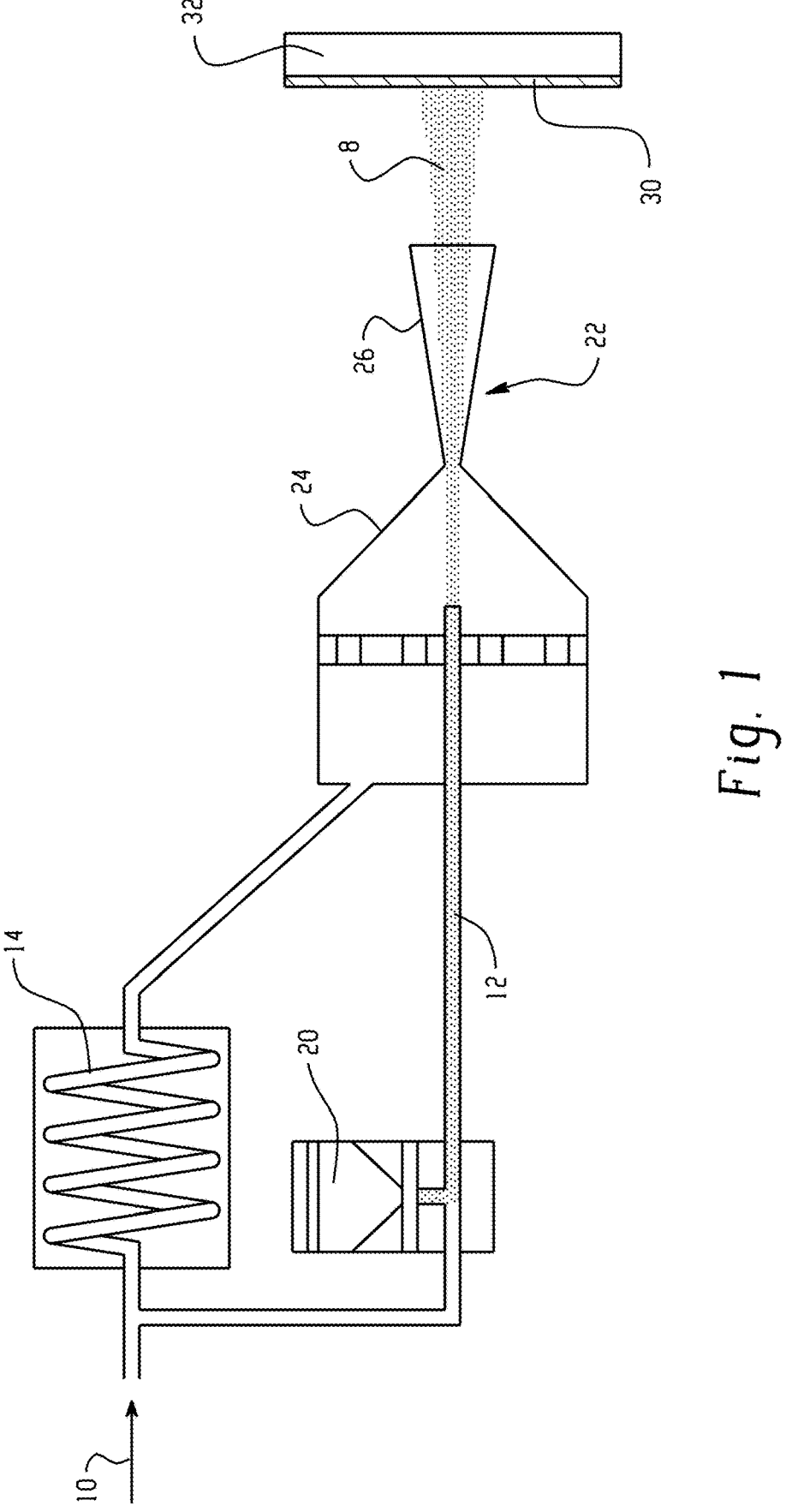
FIG. 1 is an illustration of an aspect of the cold spraying process.

A method of cold spraying a metallic coating on a busbar was developed that is able to form a coherent coating having a thickness of greater than or equal 10 micrometers, or greater than or equal to 20 micrometers. As used herein, the term coherent refers to the coating covering the desired surface area of the busbar such that the underlying surface is not exposed in the desired coated region, where the coating can be free of pinholes. The coating formed by cold spraying is improved as compared to traditional coatings formed by galvanic processes as the cold spray coating is both more uniform and rougher than galvanic coatings. When considering the coating uniformity, galvanic coatings can have large scale thickness variations of more than 100% from the edge to the center of the galvanic coating, whereas the variations in the average thickness of the cold spray coating across the surface can be significantly less. When considering the roughness, galvanic coatings can have a low surface roughness of 0.2 to 3 micrometers, whereas the cold spray coatings can have surface roughness values of more than 1.5 micrometers to more than 15 micrometers depending on the type of roughness measured. The cold spray method comprises cold spraying a powder, e.g., a cold spray composition, comprising the plurality of metal particles onto a busbar at a velocity sufficiently high to cause the plurality of particles, e.g., reactive particles, to deform upon contact with the busbar thereby forming the coating on the busbar. As used herein, the surface roughness can be measured using a calibrated roughness tester PCE-RT 1200 using a measuring pin PCE-RT2000-RP200 on a sample length, Ir, of 0.8 millimeters, and an evaluation length, In, of 5×0.80 at a speed of 0.5 millimeters per second (mm/s).

The plurality of metal particles is applied to the busbar by cold spraying. The metal particles can comprise at least one of nickel, tin, silver, zinc, or copper. The metal particles can comprise nickel. The plurality of metal particles can comprise greater than or equal to 50 weight percent (wt %), or 60 to 100 wt %, or 90 to 100 wt %, of at least one of nickel, tin, silver, zinc, or copper based on the total weight of the metal particles. The plurality of metal particles can comprise greater than or equal to 50 wt %, or 60 to 100 wt %, or 90 to 100 wt %, of nickel based on the total weight of the metal particles. The plurality of metal particles can have an average particle size of 4 to 45 micrometers, or 10 to 45 micrometers, or 15 to 40 micrometers, or 15 to 25 micrometers, as determined using a light scattering particle size distribution analyzer.

The busbar can comprise at least one of zinc, copper, or aluminum. Prior to the cold spraying, the busbar can be cleaned to remove any corrosion or oxidation products. Such cleaning can be accomplished, for example, by grit blasting with alumina particles, by scrubbing with a nonwoven web and then wiping with a paper towel and ethanol.

The present cold spraying process is a kinetic spray process that sprays the metal particles at a high velocity onto the busbar. The metal particles undergo plastic deformation upon collision with the surface of the busbar that allows it to bond to the surface of the busbar. Specifically, the cold spraying can comprise mixing the plurality of metal particles into a gas stream to provide a powder having a working pressure and a working temperature; accelerating the powder in a supersonic jet; and directing the supersonic jet onto the busbar, wherein the plurality of metal particles impinges the busbar at a velocity sufficient to cause the particles to deform and form the metal coating on the busbar. The cold spraying can form a coating having an average thickness of greater than or equal to 10 micrometers, or 15 to 500 micrometers, or 20 to 300 micrometers.

FIG. 1 illustrates an aspect of the cold spray process. FIG. 1 illustrates that compressed gas 10 can be in fluid communication with a powder feeder 20. Metal particles can be fed from the powder feeder 20 to spray nozzle 22 via conduit 12. A regulator can be present on the gas supply 10 to control the gas pressure. The gas can comprise at least one of helium, nitrogen, a noble gas (such as argon), air, or carbon dioxide. The gas can comprise at least one of helium, nitrogen, or argon. The gas can comprise nitrogen. The gas can comprise greater than or equal to 90 atomic percent helium, for example, 100 atomic percent helium. Using helium and optionally hydrogen can facilitate the cold spray process occurring without heating, as helium and hydrogen have high gas velocities even at room temperature of about 23 degrees Celsius (° C.). Conversely, the gas can comprise nitrogen, for example, 90 to 100 atomic percent nitrogen based on the total amount of atoms and the gas can be heated prior to the cold spraying.

The gas can be unheated before it mixes with the metal particles from the powder feeder 20. Conversely, the gas can be heated, for example, using an in-line heater prior to mixing with the metal particles. A portion of the gas can be heated in heater 14.

The powder can be accelerated to form a supersonic jet 8 by passing through the nozzle 22. The nozzle 22 can be a de Laval type nozzle that has a converging portion 24 and a diverging terminal portion 26. From the nozzle 22, the supersonic jet 8 is directed towards busbar 32 to form the metal coating 30 thereon. Bonding of the metal particles onto the busbar is a multistep process that includes impact with the surface, whereby a shockwave propagates from the impact location causing a plastic flow of the metal due to adiabatic heating at the interface of the metal particle and the busbar. The heating and strain localization causes a shear instability that results in plastic flow at the interface that results in deformation and adherence of the metal particle to the substrate. Building up multiple particles on the surface of the busbar forms the resultant coating. The resultant coating can have a compressive residual stress. Successful coating is dependent on several factors including velocity, temperature, pressure, and on the respective materials.

The metal particles can impinge the busbar 32 at a velocity sufficient to cause the particles to deform and form the metal coating on the busbar. If the particle velocity is too low, the particles will not have sufficient energy to cause the particle deformation and the particles will therefore not coat the surface of the busbar. If the particle velocity is too high, it will reach the erosion velocity, where the metal particles will erode having a high rebound coefficient and a coating likewise may not form. Thus, there is a minimum critical velocity $(V_c)$ and a maximum velocity $(V_m)$ between which there is an optimum velocity $(V_o)$ that, at a specific temperature, gives an optimum deposition efficiency. In practical situations, monitoring gas pressure is easier than monitoring powder velocity. Thus, gas pressure and temperature can be used to control the velocity of the powder and to avoid velocities that are too low or too high. Further, when the gas is at the working temperature, it can allow for a higher velocity to be achieved in the supersonic jet and can keep the gas from rapidly cooling and freezing once it expands past the throat of the nozzle.

The gas incident to the inlet of the converging portion 24 of the nozzle can have a working pressure of 2.5 to 10 megapascals (MPa), or 6 to 10 MPa. The gas incident to the inlet of the converging portion 24 of the nozzle can have a working temperature of 10 to 800° C., or 10 to 700° C., or 500 to 800° C., or 500 to 700° C. Conversely, the gas can be at room temperature, for example, at a temperature of 20 to 25° C.

The flow of powder carrying gas into the applicator before the converging portion can be 50 to 500 standard liters per minute (SLM), or 80 to 200 SLM. The particle exit velocity from the nozzle 22 can be 80 to 1,500 meters per second (m/s), 300 to 1,500 m/s, or 500 to 1,000 m/s. The busbar 32 can be located 5 to 30 millimeters (mm) away from the exit port of the nozzle 22.

During the coating, the busbar 32 can be stationary and nozzle 22 can be translated during coating; busbar 32 can be translated during coating and nozzle 22 can be stationary; or both busbar 32 and nozzle 22 can be translated during coating. Repeated scanning of the busbar 32 can result in a more uniform coating than a single pass. The nozzle and/or the busbar 32 can be translated via one or more robot arms. The robot arm can have three or more degrees of freedom. The robot arm can move at a constant translation rate or at a step rate where it moves a specified distance, stops for hold time, and repeats the process. The path of the nozzle along the surface of the busbar can be specified to coat only a region of the surface or a mask, e.g., an aluminum mask, can be used to block coverage of the coating in the masked region. Accordingly, selective coating of a busbar can be achieved.

In an aspect, more than one coating layer can be formed on the busbar. For example, two, three, four, five, or greater than five coating layers can be formed. In an aspect, the number of coating layers formed on the busbar can be fifty or less, fourth or less, third or less, twenty or less, or ten or less, for example.

The material of the substrate can affect a desired number of coating layers, a desired coating average thickness, a working temperature, or a combination thereof. For example, for a copper busbar, a single coating layer can be desirable, and for an aluminum busbar, more than one coating layer can be desirable, for example, two layer, three layer, or more than three layers may be desirable. For a copper busbar, an average thickness of a coating of greater than or equal to 10 micrometers can be desirable, and for an aluminum busbar, an average thickness of a coating of greater than or equal to 20 micrometers or greater than 20 micrometers can be desirable. For a copper busbar, a working temperature of to 800° C., or 10 to 700° C., or 500 to 800° C., or 500 to 700° C. can be desirable, and for an aluminum busbar, a working temperature of 10 to less than 650° C., or 500 to less than 650° C., can be desirable. In an aspect, the busbar can include aluminum and the coating can have an average thickness of greater than 20 micrometers, more than one coating layer can be formed on the busbar, the working temperature can be 500 to less than 650° C., or a combination thereof.

The shape of the nozzle can be, for example, round or elliptical (also referred to herein as "wide"). In an aspect, a round nozzle can have a diameter of 4 to 10 mm, 5 to 8 mm, or 6 to 7 mm. In an aspect, an elliptical nozzle can have a major axis having a length of 9 to 15 mm, 10 to 14 mm, or 11 to 13 mm and a minor axis having a length of 0.5 to 6 mm, 1 to 5 mm, or 2 to 4 mm.

A nozzle with a larger major axis (e.g., as compared to a nozzle having an elliptical shape with a smaller major axis or compared to a round nozzle with a small diameter) can help increase coating throughput (e.g., a coating can be made faster, saving costs), which can be a function of the step size. For example, an increase in step from 1 mm to 2 mm can allow a same area to be coating in half the time.

With further reference to process parameters, the speed of the spray nozzle along the surface of the busbar (also referred to herein as "robot speed") can be, for example, 50 to 1,200 millimeters per second (mm/s), 100 to 1,000 mm/s, or 200 to 900 mm/s. The speed of the powder feeder (PF) (also referred to herein as "powder feeder speed" or "PF speed) can be, for example, 0.5 to 20 revolutions per minute (rpm), 1 to 15 rpm, or 2 to 14 rpm. A step distance the spray nozzle moves per motion (also referred to herein as "step" or "step size") can be, for example, 0.1 to 5 mm, 0.25 to 2 mm, or 0.5 to 1 mm. In an aspect, greater coating throughput can be achieved with a step size of, for example, 1 to 5, 1 to 3 mm, 1 to 2 mm, greater than 1 to 5 mm, greater than 1 to 3 mm, or greater than 1 to 2 mm. Such a step size of greater than or equal to 1 mm or greater than 1 mm can be aided by use of a "wide" nozzle as disclosed further herein.

In an aspect, a combination of process parameters can help achieve desirable coating throughput. For example, such a combination of process parameters can include a temperature of 500 to 700° C.; a pressure of 2.5 to 10 megapascals; a flow rate at which the powder exits the diverging terminal portion of 50 to 500 standard liters per minute; and a distance the nozzle moves per motion of 1 to 5 millimeters, or greater than 1 to 5 millimeters.

The coating can be the outermost layer. In other words, the coating can be free of any additional coatings such as abrasion resistant coatings and the like. Without intending to be bound by theory, it is believed that such an additional coating could be detrimental to achieving the desired contact resistance.

The method and coating can include one or more of the following aspects.

A method of forming a coating on a busbar can comprise cold spraying a powder comprising a plurality of metal particles onto the busbar at a velocity sufficiently high to cause the plurality of metal particles to deform upon contact with the busbar thereby forming the coating on the busbar.

The plurality of metal particles can comprise greater than or equal to 50 weight percent of at least one of nickel, tin, silver, zinc, or copper based on the total weight of the metal particles.

The coating can be coherent and/or can have an average thickness of greater than or equal to 10 micrometers.

The cold spraying can comprise mixing the plurality of metal particles into a gas stream having a working pressure and a working temperature to provide the powder; passing the powder through a nozzle to accelerate the powder in a supersonic jet; and directing the supersonic jet onto the busbar.

The nozzle can include a converging portion and a diverging terminal portion.

The powder can have a working pressure of 2.5 to 10 megapascals, or 6 to 10 megapascals. The powder can enter a converging portion of the nozzle at a working pressure of 2.5 to 10 megapascals, or 6 to 10 megapascals.

The powder can have a working temperature of 10 to 800° C., or 500 to 800° C. The powder can enter the converging portion of the nozzle at a working temperature of 10 to 800° C., or 500 to 800° C.

The powder can exit the diverging terminal portion at a flow rate of 50 to 500 standard liters per minute.

The method can comprise translating the nozzle and/or the busbar relative to the other during the cold spraying.

The plurality of metal particles can have an average particle size of 4 to 45 micrometers, or 10 to 45 micrometers, as determined using a light scattering particle size distribution analyzer.

The plurality of metal particles can comprise 60 to 100 wt %, or 90 to 100 wt %, of at least one of nickel, tin, silver, zinc, or copper based on the total weight of the metal particles.

The plurality of metal particles can comprise nickel.

The busbar can comprise at least one of zinc, copper, or aluminum.

The busbar can be located 5 to 30 mm away from an exit port of the nozzle.

The exit port of the nozzle can include or be, for example, a round shape or an elliptical shape.

The method can include forming more than one coating on the busbar.

The busbar can comprise aluminum; and the coating can have an average thickness of greater than 20 micrometers, the method can comprise forming more than one coating layer on the busbar, or a combination thereof.

The cold spraying can comprise process parameters comprising a temperature of 500 to 700 degrees Celsius; a pressure of 2.5 to 10 megapascals; a flow rate at which the powder exits the diverging terminal portion of 50 to 500 standard liters per minute; and a distance the nozzle moves per motion of 1 to 5 millimeters, or greater than 1 to 5 millimeters.

The mask can be applied to the busbar prior to the cold spraying such that the coating is only sprayed onto an unmasked portion of the busbar.

The average thickness of the coating can be 15 to 500 micrometers, or 20 to 300 micrometers.

The coating can be free of pinholes or can have 0 pinholes.

The coating can have a coating thickness having a standard deviation of less than or equal to 5 micrometers; wherein the coating thickness is an average of at least four different locations on the surface.

The coating can have a roughness Ra or Rq value of greater than or equal to 1 micrometers.

The coating can have a roughness Rz or Rt value of greater than 10 micrometers.

The coating can have a lower contact resistance as compared to a coating of the same average thickness formed by galvanic nickel plating. In an aspect, a contact resistance can desirably be less than 10 microohms ($\mu\Omega$).

The following examples are provided to illustrate articles with enhanced thermal capability. The examples are merely illustrative and are not intended to limit devices made in accordance with the disclosure to the materials, conditions, or process parameters set forth therein.

EXAMPLES

Examples 1-7: Effect of the Cold Spray Parameters on the Coating

Nickel particles were sprayed onto a copper substrate via cold spraying with a standard round nozzle VRC NZZL0060 (tungsten carbide nozzle having a length of 196 mm, a throat diameter of 2 mm, and an exit diameter of 6.3 mm). The nickel particles were NI-914-3 having a particle size of 45 micrometers plus or minus 16 micrometers and were obtained from Astro Alloys Inc. The cold spraying was performed at a temperature of 600° C., a pressure of 943 pounds per square inch (6.5 megapascals), and a powder flow rate of 100 standard liters per minute (SLM). The substrate was located 25 mm away from an exit port of the nozzle. The remaining parameters are provided in Table 1, where the powder feeder (PF) speed is in revolutions per minute (rpm), the robot speed refers to the speed of the spray nozzle along the surface in millimeters per second (mm/s), and the step refers to the step distance the spray nozzle moves per motion in millimeters (mm). The resultant thickness and coating coherency evaluations, where Y means confluent and N means not confluent, are provided in Table 1, a top-down photographic image of Examples 1 to 7 is provided in FIG. 2, and cross-sectional images of Example 4 and Example 5 are provided in FIG. 3 and FIG. 4, respectively.

TABLE 1

| Example | 1 | 2 | 3 | 4 | 5 | 6 | 7 |
|---|---|---|---|---|---|---|---|
| PF speed (rpm) | 5 | 2 | 5 | 5 | 2.5 | 2 | 2 |
| Robot speed (mm/s) | 200 | 200 | 600 | 400 | 400 | 600 | 600 |
| Step (mm) | 0.5 | 0.5 | 0.5 | 1 | 1 | 1 | 2 |
| | | | Coating Properties | | | | |
| Thickness (micrometers) | 275 | 130 | 105 | 90 | 50 | 30 | 15 |
| Coherent coating | Y | Y | Y | Y | N | N | N |

Figure 2:
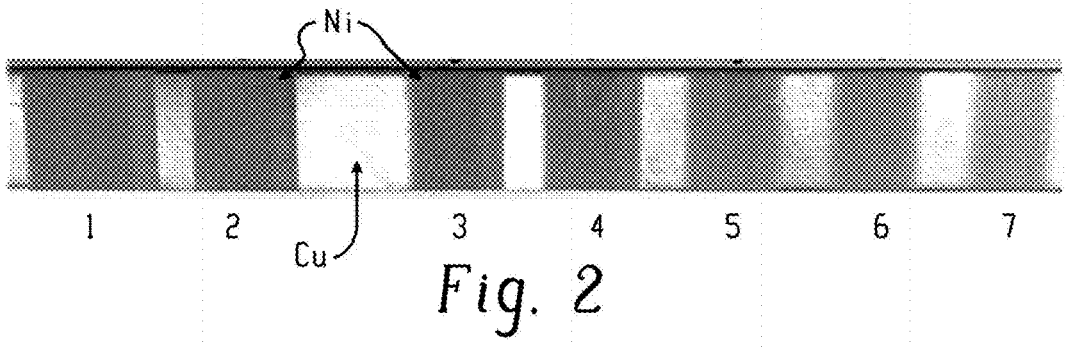
FIG. 2 is a photographic image of the coatings formed in Examples 1 to 7.
Figure 3:
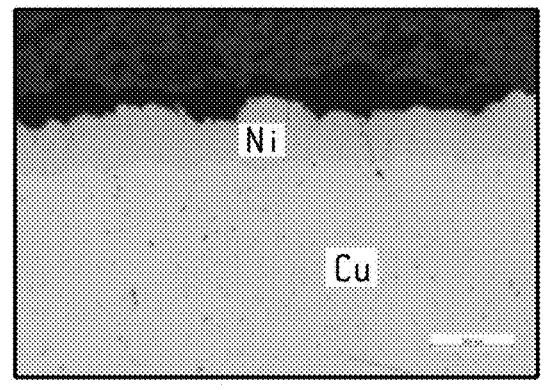
FIG. 3 is an optical microscope image of the coating of Example 4.
Figure 4:
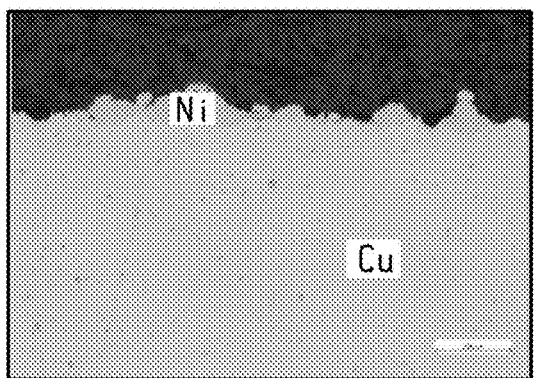
FIG. 4 is an optical microscope image of the coating of Example 5.

Table 1 illustrates that the powder feeder speed, the robot speed, and the step size can be tuned to result in coherent coatings having thickness of greater than 0.050 millimeters. The formation of the coherent coatings, i.e., of solid or confluent coatings, of Examples 1 to 4 and the non-coherent coatings of Examples 5 to 7 on the substrate is shown in FIG. 2, where the copper substrate cannot be seen through the coherent nickel coatings of Examples 1 to 4. FIG. 3 and FIG. 4 further show that the nickel fully covers the copper substrate of Example 4, whereas it does not fully cover the copper substrate of Example 5, respectively.

Figure 5:
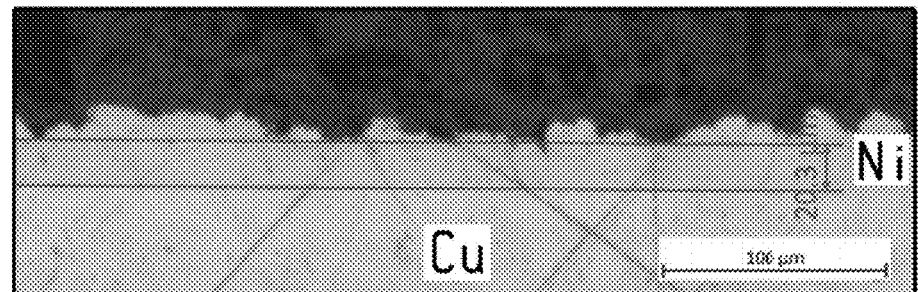
FIG. 5 is an optical microscope image of the coating of Example 8.

Example 8: Cold Spraying of Nickel Particles Having a Particle Size of 20 Micrometers Nickel particles having a particle size of 20 micrometers or less from Atlantic Equipment Engineers, Inc. were sprayed onto a copper substrate via cold spraying in accordance with Examples 1 to 7. The cold spraying was performed at a temperature of 600° C., a pressure of 6.5 MPa, a powder flow rate of 150 SLM, a powder feeder speed of 4.5 rpm, a robot speed of 900 mm/s, and a step size of 0.5 mm. A cross-sectional image of is resultant coating is in FIG. 5. FIG. 5 shows that the coating is coherent, having a thickness of 33 micrometers with a standard deviation of only 3.8 micrometers. This example shows that thinner coherent coatings can be formed using nickel particles having a smaller particle size as compared to the particles of Examples 1-4.

Example 9: Cold Spraying of Nickel Particles onto an Aluminum Substrate

Figure 6:
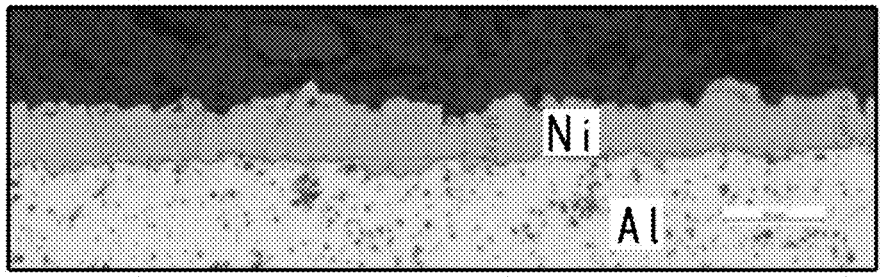
FIG. 6 is an optical microscope image of the coating of Example 9.

Nickel particles were sprayed onto an aluminum substrate via cold spraying in accordance with Example 8. The cold spraying was performed at a temperature of 600° C., a pressure of 6.5 MPa, a powder flow rate of 150 SLM, a powder feeder speed of 3 rpm, a robot speed of 600 mm/s, and a step size of 1 mm. A cross-sectional image of is resultant coating is in FIG. 6. FIG. 6 shows that the coating is coherent, having a thickness of 19.7 micrometers with a standard deviation of 3.9 micrometers.

Example 10: Environmental Testing of the Cold Spray Coated Substrates

Figure 7A:
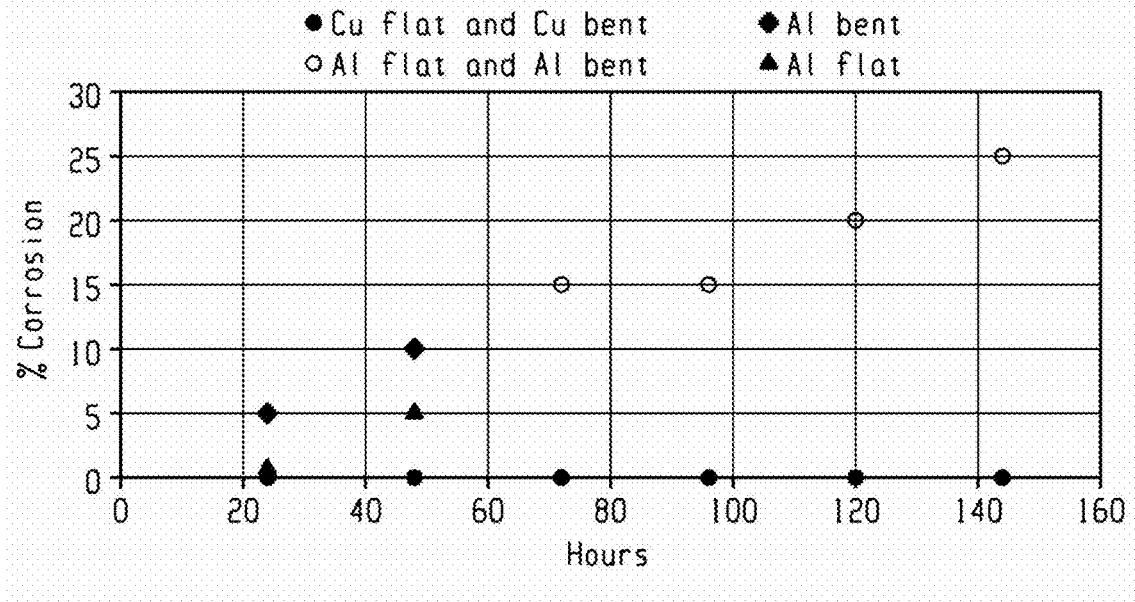
FIG. 7A is a graphical illustration of the corrosion with salt spraying time of Example 10.
Figure 7B:
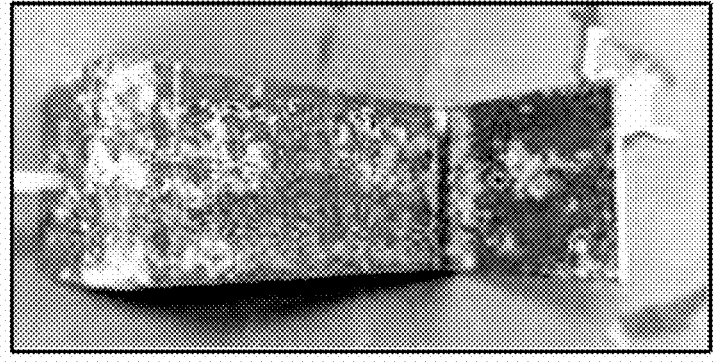
FIG. 7B is a photographic image of the bent sample of Example 10.
Figure 7C:
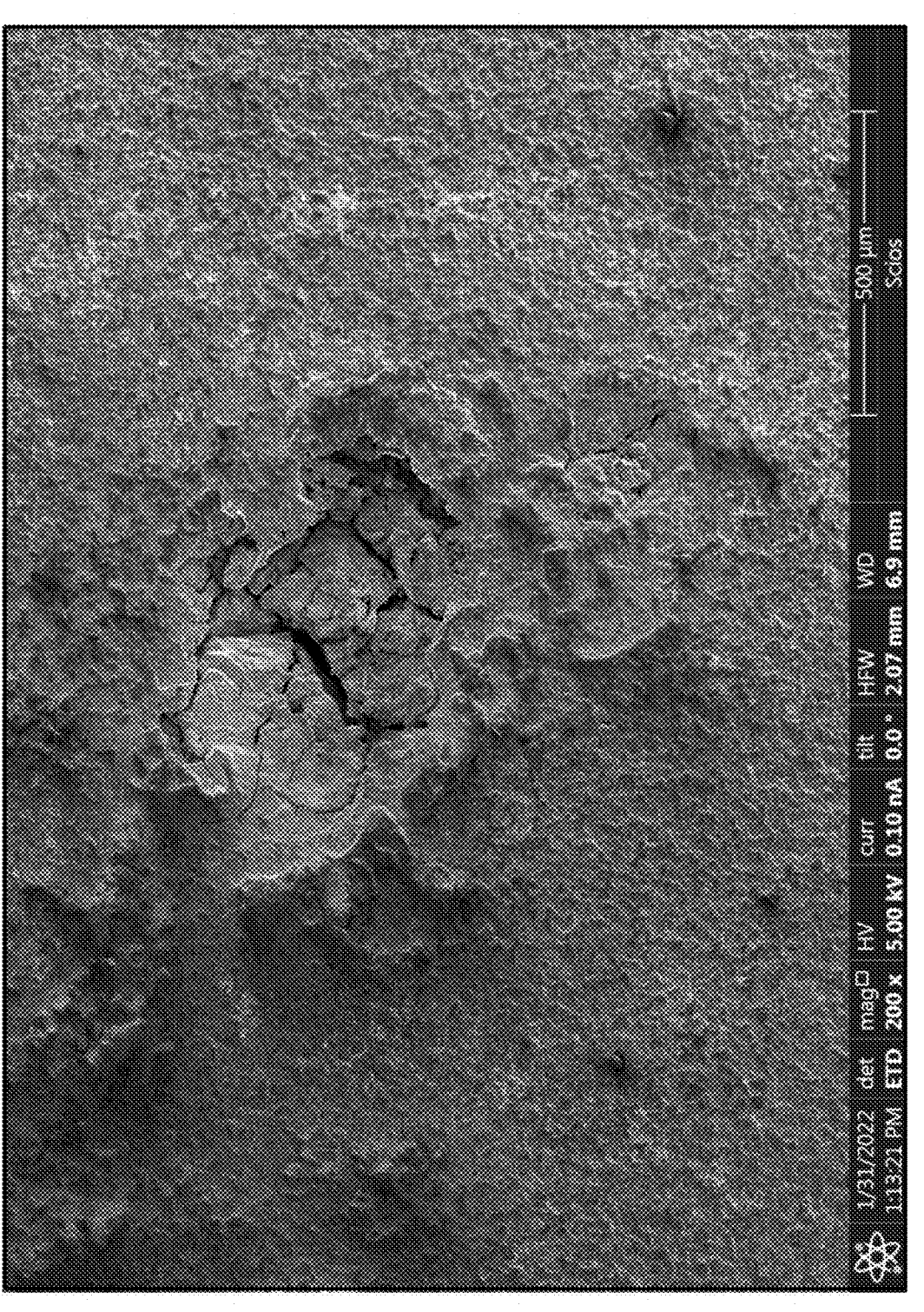
FIG. 7C is a scanning electron microscope image of a corroded sample of example 10.

The coated substrates of Examples 8 and 9 were exposed to a salt spray for 144 hours. The percent corrosion in area percent was determined with time on flat samples and on samples with two 90 degree bends that were formed after coating. An image of the aluminum coated substrate with some salt corrosion and with two 90 degree bends is shown in FIG. 7B. FIG. 7A shows the percent corrosion with spraying time in hours. FIG. 7A shows that the nickel coatings on the copper substrate did not corrode after 144 hours of spraying, even in the bent area. FIG. 7A shows that the nickel coating on the aluminum substrate started to corrode after 20 hours of salt spraying and that there was some increased corrosion in the bent area. It is noted that the respective coatings remained intact and did not delaminate. Instead, the corrosion formed white areas on the surface. A scanning electron microscope image of one of the areas is shown in FIG. 7C and shows that cracks were formed in the coating.

As can be seen in FIG. 7A, the aluminum substrates exhibited greater percent corrosion than the copper substrates. As can be seen in FIG. 7A, for a salt spray time of less than 60 hours, the bent aluminum sample exhibited greater percent corrosion than the flat aluminum sample, and for a salt spray time of greater than 60 hours, the bent aluminum sample exhibited equivalent percent corrosion to the flat aluminum sample. As can be seen in FIG. 7A, the bent copper sample exhibited equivalent percent corrosion to the flat copper sample.

Examples 11-14: Roughness Evaluation of Cold Spray Coated Surfaces

The surface roughness of cold spray coatings was compared to those prepared by galvanic coating. Example 11 is a tin coating on a copper substrate and was prepared by galvanic coating. Example 12 was a galvanized nickel coating on a copper substrate. Example 13 is a cold spray nickel coating on an aluminum substrate. Example 14 is a cold spray nickel coating on a copper substrate. The coatings of Example 12 and Example 14 were prepared in accordance with Example 8.

The surface roughness measurements were performed on the coated surfaces using a calibrated roughness tester PCE-RT 1200 (measuring pin PCE-RT2000-RP200) on a sample length, Ir, of 0.8 millimeters, and an evaluation length, In, of 5×0.80 at a speed of 0.5 mm/s. Ra is the integer mean of all absolute roughness profile deviations from the centerline within the measurement length. Rz is the absolute peak to valley average of five sequential sampling lengths within the measuring length. Rt is the vertical distance between the highest peak and lowest peak of the roughness profile R within the overall measuring distance. Rq is the root mean square deviation.

Figure 8:
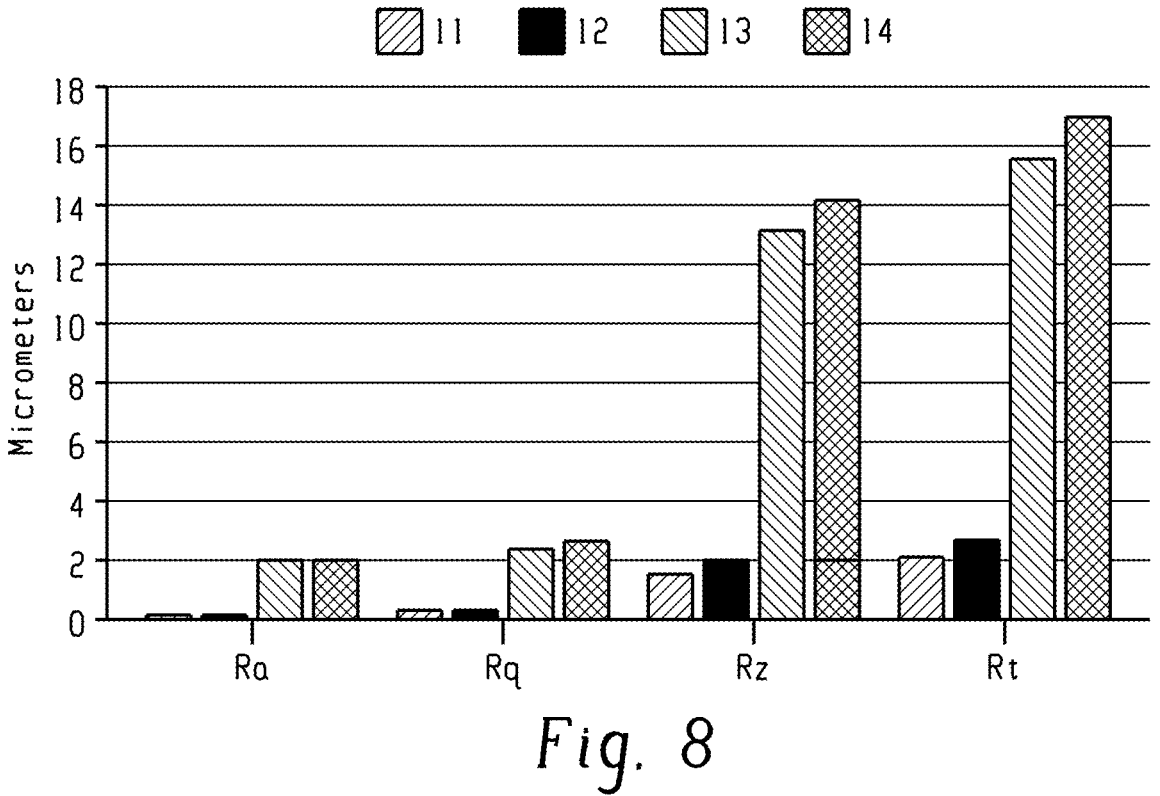
FIG. 8 is a graphical illustration of the roughness values for Examples 11 to 14.

The measured surface roughness values are shown in FIG. 8. FIG. 8 shows that the surface roughness of the cold spray coatings for each parameter measured significantly increased relative to the galvanic coatings.

Examples 15-18: Environmental Testing of Cold Spray Coated Substrates

Nickel particles having a particle size of 20 micrometers or less from Atlantic Equipment Engineers, Inc. were sprayed onto an aluminum substrate via cold spraying in accordance with Example 8 with a standard round nozzle VRC NZZL0060 or a "wide" nozzle VRC NZZL0086 (tungsten carbide nozzle having a length of 196 mm, a throat diameter of 2 mm, and an elliptical exit measuring 3 mm×12 mm (measured by calipers)). The cold spraying was performed at a temperature of 600° C., a pressure of 950 psi (6.6 MPa), a powder flow rate of 150 SLM, and a robot speed of 600 minis. The substrate was located 25 mm away from an exit port of the nozzle. The remaining parameters are provided in Table 2.

TABLE 2

| Example | 15 | 16 | 17 | 18 |
|---|---|---|---|---|
| PF speed (rpm) | 3 | 11.5 | 14 | 3 |
| Step (mm) | 1 | 2 | 2 | 1 |
| Nozzle | Round | Wide | Wide | Round |
| Coating Properties | | | | |
| Number of coating layers | 2 | 2 | 2 | 1 |
| Total coating thickness (micrometers) | 20 | 20 | 30 | 20 |

Figure 9:
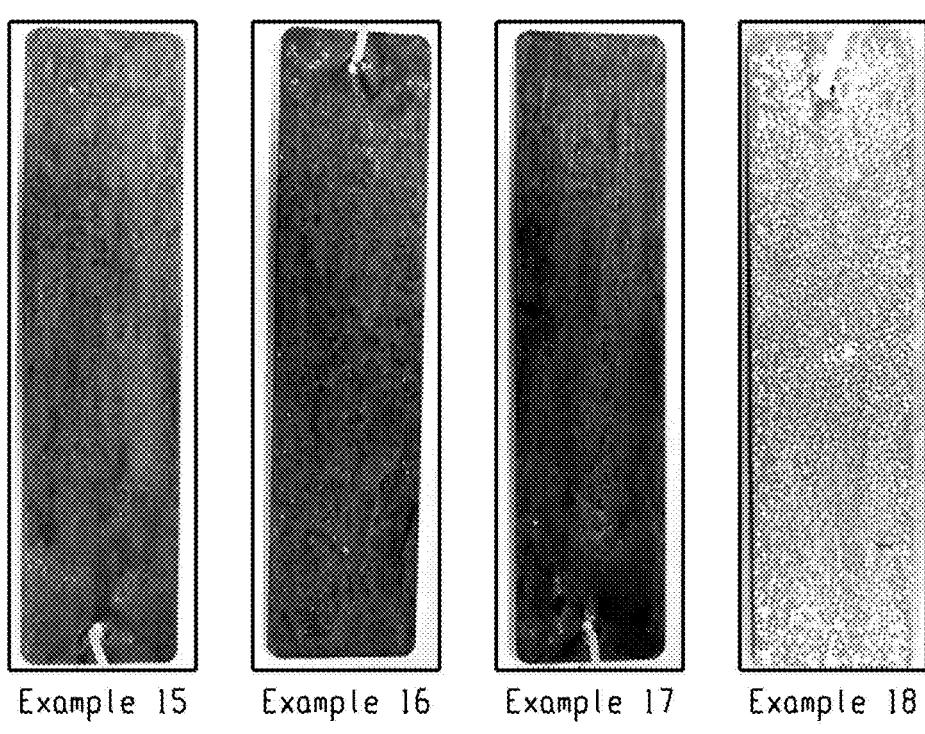
FIG. 9 is photographic image of the samples of Examples 15 to 18.
Figure 10:
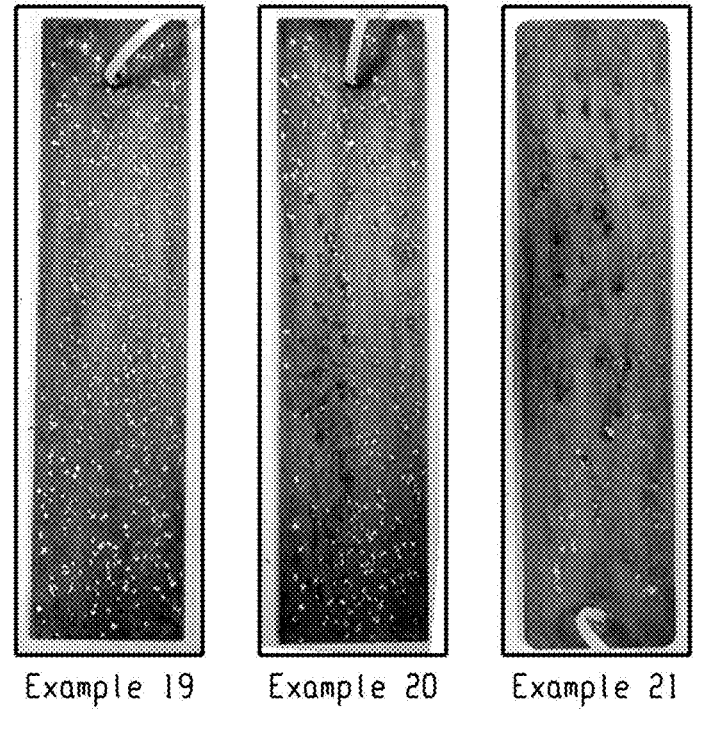
FIG. 10 is photographic image of the samples of Examples 19 to 21.

The coated substrates were exposed to a salt spray for 144 hours. An image of the aluminum coated substrate with some salt corrosion is shown in FIG. 10. FIG. 10 shows that the nickel coatings on the aluminum substrates of Examples 15-17 did not corrode after 144 hours of spraying. FIG. 9 shows that the nickel coating on the aluminum substrate of Example 18 started to corrode. It is noted that the respective coatings remained intact and did not delaminate. Instead, the corrosion formed white areas on the surface of Example 18.

Examples 15-18 show that multiple coating layers can improve corrosion inhibition capability. Each of Examples 15-17 had two coating layers while Example 18 had one coating layer. As can be seen in FIG. 9, Example 18 started to corrode after 144 hours of exposure to a salt spray, while Examples 15-17 did not exhibit corrosion. Use of a wide nozzle allowed for an increase in step size from 1 mm to 2 mm. Accordingly, a same area could be coating in half the time.

Examples 19-21: Environmental Testing of Cold Spray Coated Substrates

Nickel particles having a particle size of 8 micrometers or less were sprayed onto an aluminum substrate via cold spraying in accordance with Example 8 with a "wide" nozzle VRC NZZL0086 (tungsten carbide nozzle having a length of 196 mm, a throat diameter of 2 mm, and an elliptical exit measuring 3 mm×12 mm (measured by calipers)). The cold spraying was performed at a temperature of 650° C., a pressure of 950 psi (6.6 MPa), a PF speed of 10 rpm, a powder flow rate of 150 SLM, a robot speed of 600 mm/s, and a step size of 2 mm. The substrate was located 25 mm away from an exit port of the nozzle. The remaining parameters are provided in Table 3.

TABLE 3

| Example | 19 | 20 | 21 |
|---|---|---|---|
| Coating Properties | | | |
| Number of coating layers | 1 | 2 | 3 |
| Total coating thickness (micrometers) | 20 | 40 | 60 |

10

The coated substrates were exposed to a salt spray for 144 hours. An image of the aluminum coated substrate with some salt corrosion is shown in FIG. 10. FIG. 10 shows that the nickel coating on the aluminum substrate of Examples 19-21 started to corrode after 144 hours of spraying. It is noted that the respective coatings remained intact and did not delaminate. Instead, the corrosion formed white areas on the surface of Examples 19-21.

Examples 19-21 show that multiple coating layers, greater coating thickness, or a combination thereof can improve corrosion inhibition capability. Example 19 had 1 coating layer and total coating thickness of 20 μm, Example 20 had 2 coating layers and total coating thickness of 40 μm, and Example 21 had 3 coating layers and total coating thickness of 60 μm. As can be seen in FIG. 10, after 144 hours of exposure to a salt spray, Example 19 exhibited more corrosion that Example 20 and Example 20 exhibited more corrosion that Example 21.

While the disclosure has been described with reference to exemplary aspects, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular aspects disclosed as the best mode contemplated for carrying out this disclosure, but that the disclosure will include all aspects falling within the scope of the appended claims.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A method of forming a coating on a busbar, comprising:
   cold spraying a powder comprising a plurality of metal particles onto the busbar at a velocity sufficiently high to cause the plurality of metal particles to deform upon contact with the busbar thereby forming the coating on the busbar;
   wherein the plurality of metal particles consists of at least one of nickel, silver, zinc, or copper; and
   wherein the coating has an average thickness of greater than or equal to 10 micrometers.

2. The method of claim 1, wherein the cold spraying comprises:
   mixing the plurality of metal particles into a gas stream having a working pressure and a working temperature to provide the powder;
   passing the powder through a nozzle to accelerate the powder in a supersonic jet; and
   directing the supersonic jet onto the busbar.

3. The method of claim 2, wherein the nozzle includes a converging portion and a diverging terminal portion.

4. A method of forming a coating on a busbar, comprising:
   cold spraying a powder comprising a plurality of metal particles onto the busbar at a velocity sufficiently high to cause the plurality of metal particles to deform upon contact with the busbar thereby forming the coating on the busbar;
   wherein the plurality of metal particles comprises greater than or equal to 50 weight percent of at least one of nickel, tin, silver, zinc, or copper based on the total weight of the metal particles;
   wherein the coating has an average thickness of greater than or equal to 10 micrometers; and
   wherein the working pressure is 2.5 to 10 megapascals.

5. The method of claim 2, wherein the working temperature is 10 to 800 degrees Celsius.

6. The method of claim 3, wherein the powder exits the diverging terminal portion at a flow rate of 50 to 500 standard liters per minute.

7. The method of claim 3, further comprising translating the nozzle or the busbar relative to the other during the cold spraying.

8. The method of claim 1, wherein the plurality of metal particles has an average particle size of 4 to 45 micrometers, as determined using a light scattering particle size distribution analyzer.

9. The method of claim 1, wherein the plurality of metal particles consists nickel, silver, zinc, or copper.

10. The method of claim 1, wherein the plurality of metal particles consists of nickel.

11. The method of claim 1, wherein the busbar comprises at least one of zinc, copper, or aluminum.

12. The method of claim 1, comprising forming more than one coating layer on the busbar.

13. The method of claim 1, wherein:
   the busbar comprises aluminum; and
   the coating has an average thickness of greater than 20 micrometers, the method comprises forming more than one coating layer on the busbar, or a combination thereof.

14. The method of claim 2, wherein the cold spraying comprises process parameters comprising
   a temperature of 500 to 700 degrees Celsius;
   a pressure of 2.5 to 10 megapascals;
   a flow rate at which the powder exits the diverging terminal portion of 50 to 500 standard liters per minute; and
   a distance the nozzle moves per motion of 1 to 5 millimeters.

15. The method of claim 1, wherein a mask is applied to the busbar prior to the cold spraying such that the coating is only sprayed onto an unmasked portion of the busbar.

16. A method of forming a coating on a busbar, comprising:
   cold spraying a powder comprising a plurality of metal particles onto the busbar at a velocity sufficiently high to cause the plurality of metal particles to deform upon contact with the busbar thereby forming the coating on the busbar;
   wherein the plurality of metal particles comprises greater than or equal to 50 weight percent of at least one of nickel, tin, silver, zinc, or copper based on the total weight of the metal particles; and
   wherein an average thickness of the coating is 60 to 500 micrometers.

17. The method of claim 1, further comprising:
   mixing the plurality of metal particles into a nitrogen stream having a working pressure and a working temperature to provide the powder;
   wherein cold spraying the powder comprises cold spraying the powder from a nozzle onto the busbar located 5 to 30 mm away from an exit port of the nozzle at a flow rate of 50 to 500 standard liters per minute; wherein the powder enters a converging portion of the nozzle and exits from a diverging terminal portion of the nozzle;
   wherein the plurality of metal particles has an average particle size of 4 to 45 micrometers, as determined using a light scattering particle size distribution analyzer.

* * * * *